United States Patent
Luehrsen et al.

(10) Patent No.: US 7,853,389 B2
(45) Date of Patent: Dec. 14, 2010

(54) TRACTION CONTROL FOR PERFORMANCE AND DEMONSTRATION SPIN

(75) Inventors: Eric Luehrsen, Dearborn, MI (US); Michael Glenn Fodor, Dearborn, MI (US); Don Perlick, Farmington Hills, MI (US); Daniel Dunn, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 571 days.

(21) Appl. No.: 11/926,516

(22) Filed: Oct. 29, 2007

(65) Prior Publication Data
US 2009/0112437 A1  Apr. 30, 2009

(51) Int. Cl.
*B60T 8/1763* (2006.01)
*B60K 28/16* (2006.01)

(52) U.S. Cl. .............. 701/82; 701/84; 701/90; 701/36; 180/197; 303/141

(58) Field of Classification Search .................. None
See application file for complete search history.

(56) References Cited

U.S. PATENT DOCUMENTS

| | | | |
|---|---|---|---|
| 4,916,619 A * | 4/1990 | Walenty et al. | 701/75 |
| 5,163,530 A | 11/1992 | Nakamura et al. | |
| 5,183,127 A | 2/1993 | Kageyama et al. | |
| 5,193,889 A | 3/1993 | Schaefer et al. | |
| 5,224,044 A | 6/1993 | Tamura et al. | |
| 5,265,693 A | 11/1993 | Rees et al. | |
| 5,320,422 A * | 6/1994 | Tsuyama et al. | 303/141 |
| 5,373,447 A | 12/1994 | Howes et al. | |
| 5,090,511 A | 2/1995 | Kabasin | |
| 5,469,359 A | 11/1995 | Tsuyama et al. | |
| 5,628,378 A | 5/1997 | Saito et al. | |
| 5,732,376 A * | 3/1998 | Hrovat et al. | 701/80 |
| 5,735,362 A | 4/1998 | Hrovat et al. | |
| 5,765,657 A * | 6/1998 | Fukumura et al. | 180/197 |

(Continued)

FOREIGN PATENT DOCUMENTS

DE  69009586 T2  9/1994

(Continued)

OTHER PUBLICATIONS

ISA Intellectual Property Office, International Search Report of GB0817399.9, Jul. 10, 2009, United Kingdom, 2 pages.

(Continued)

*Primary Examiner*—Thomas G Black
*Assistant Examiner*—Lin B Olsen
(74) *Attorney, Agent, or Firm*—Fredrick Owens; Alleman Hall McCoy Russell & Tuttle LLP

(57) ABSTRACT

A method is provided for controlling a powertrain of a vehicle comprising wheels, and an accelerator pedal actuated by a driver. The method comprises controlling wheel slip to a first amount during a first road condition, the first amount independent of a driver requested output; and controlling the wheel slip to a second amount during a second road condition, the second amount based on the driver requested output, the second road condition having higher friction than the first road condition.

20 Claims, 7 Drawing Sheets

U.S. PATENT DOCUMENTS

| | | | |
|---|---|---|---|
| 5,884,719 A * | 3/1999 | Schramm et al. | 180/197 |
| 5,952,564 A | 9/1999 | Naito et al. | |
| 5,957,991 A | 9/1999 | Yasuda | |
| 6,050,652 A | 4/2000 | Kolbe et al. | |
| 6,128,568 A | 10/2000 | Sasaki | |
| 6,269,297 B1 | 7/2001 | Hosomi et al. | |
| 6,314,342 B1 | 11/2001 | Kramer et al. | |
| 6,401,853 B1 | 6/2002 | Turski et al. | |
| 6,591,178 B2 | 7/2003 | Krueger et al. | |
| 6,952,637 B2 | 10/2005 | Barron et al. | |
| 7,349,776 B2 * | 3/2008 | Spillane et al. | 701/36 |
| 2004/0015279 A1 | 1/2004 | Barron et al. | |
| 2004/0098188 A1 | 5/2004 | Priemer et al. | |
| 2004/0211609 A1 * | 10/2004 | Schmitt | 180/197 |
| 2005/0256629 A1 * | 11/2005 | Tao et al. | 701/87 |
| 2006/0052908 A1 | 3/2006 | Matsumoto et al. | |
| 2006/0080022 A1 * | 4/2006 | Hrovat et al. | 701/82 |
| 2006/0080023 A1 | 4/2006 | Hrovat et al. | |
| 2006/0144598 A1 | 7/2006 | Johnson et al. | |
| 2006/0149445 A1 | 7/2006 | Suzumura et al. | |
| 2006/0158031 A1 | 7/2006 | Kummel et al. | |
| 2007/0027606 A1 | 2/2007 | Fodor et al. | |
| 2008/0249689 A1 | 10/2008 | Matsumoto et al. | |
| 2009/0107748 A1 * | 4/2009 | Luehrsen et al. | 180/197 |

FOREIGN PATENT DOCUMENTS

| | | |
|---|---|---|
| DE | 102005033354 A1 | 3/2006 |
| EP | 1533171 | 5/2005 |
| EP | 1978278 | 10/2008 |
| GB | 2394311 | 4/2004 |
| GB | 2446419 | 8/2008 |
| JP | 11351367 | 12/1999 |
| WO | 2008/050782 | 5/2008 |
| WO | 2009/002442 | 12/2008 |

OTHER PUBLICATIONS

ISA Intellectual Property Office, International Search Report of GB0817399.9, Jul. 10, 2009, United Kingdom, 1 page.

ISA Intellectual Property Office, International Search Report of GB0817399.9, Apr. 16, 2009, United Kingdom.

ISA, United Kingdom Intellectual Property Office, International Search Report of GB0819740.2, Jan. 21, 2009, 1 page.

ISA, United Kingdom Intellectual Property Office, International Search Report of GB0819735.2, Jan. 28, 2009, 1 page.

U.S. Appl. No. 11/928,103, filed Oct. 30, 2007, Luehrsen et al.

U.S. Appl. No. 11/925,640, filed Oct. 26, 2007, Luehrsen et al.

* cited by examiner

TRACTION CONTROL FOR PERFORMANCE AND DEMONSTRATION SPIN

FIELD

The present application relates to traction control of a vehicle, and more specifically, relates to coordinating traction control during performance and demonstration spin events.

BACKGROUND

Traction control, when activated, can override a driver's torque request and instead operates the engine at a reduced torque output and/or increases wheel braking to reduce wheel spin. The reduced wheel spin, or slip, can increase the traction between the wheels and road surface to enable a vehicle to negotiate low friction surfaces. Such an approach relies on the premise that reducing wheel slip generates increased traction.

However on a surface with a high friction coefficient ($\mu$) (e.g., a race track or a demonstration surface), higher wheel slip speeds, under specific circumstances, may provide improved acceleration and performance. This can be especially true when a driver performs various low speed demonstrations and/or wants to test the limits of performance on a closed track. Thus, in such situations, the driver can manually deactivate traction control completely in order to generate the wheel spin during an acceleration event, for example.

The inventors herein have recognized a problem with such an approach. In particular, many drivers do not have the skill to achieve and control a desired amount of wheel slip. Further still, even if the driver can generate a desired level of slip when accelerating from rest with traction control disabled, it can be difficult for the driver to control the decrease of slip as the vehicle accelerates to actually achieve any improvement in vehicle acceleration, as compared with an acceleration having little or no slip. Likewise, it can be equally difficult for the operator to manually engage traction control during the wheel spin event to obtain a controlled transition to non-slipping conditions during the vehicle launch.

SUMMARY

The inventors have recognized that it may be desirable to have a system and method that can provide traction control with some degree of driver control to meet different traction requirements for specific traction events. In one approach, a method is provided for controlling a powertrain of a vehicle comprising wheels, and a pedal actuated by a driver. The method comprises controlling wheel slip to a first amount during a first road condition, the first amount independent of a driver requested output; and controlling the wheel slip to a second amount during a second road condition, the second amount based on the driver requested output, the second road condition having higher friction than the first road condition.

The control method and system described above can enable various features. For example, when conditions are present in which a driver can achieve improved operation with wheel slip (e.g., high road friction $\mu$ and/or ambient temperature), the approach enables the driver to directly control the wheel slip or the wheel spin with the pedal. Thus, rather than translate the driver's request as a torque, the driver's request can set the level of wheel slip, with greater depression resulting in greater controlled slip. In this way, a driver can more easily perform demonstration spin and acceleration events on high performance tracks.

Also, in the example where the second amount of controlled slip is reduced with increasing vehicle speed, a controlled transition to reduced or no slip operation can be achieved smoothly during the acceleration so that a relatively inexperienced driver can actually achieve faster vehicle launch. Thus, normal operation can be restored with movement of only the pedal.

DETAILED DESCRIPTION OF THE PREFERRED EMBODIMENTS

Figure 1:
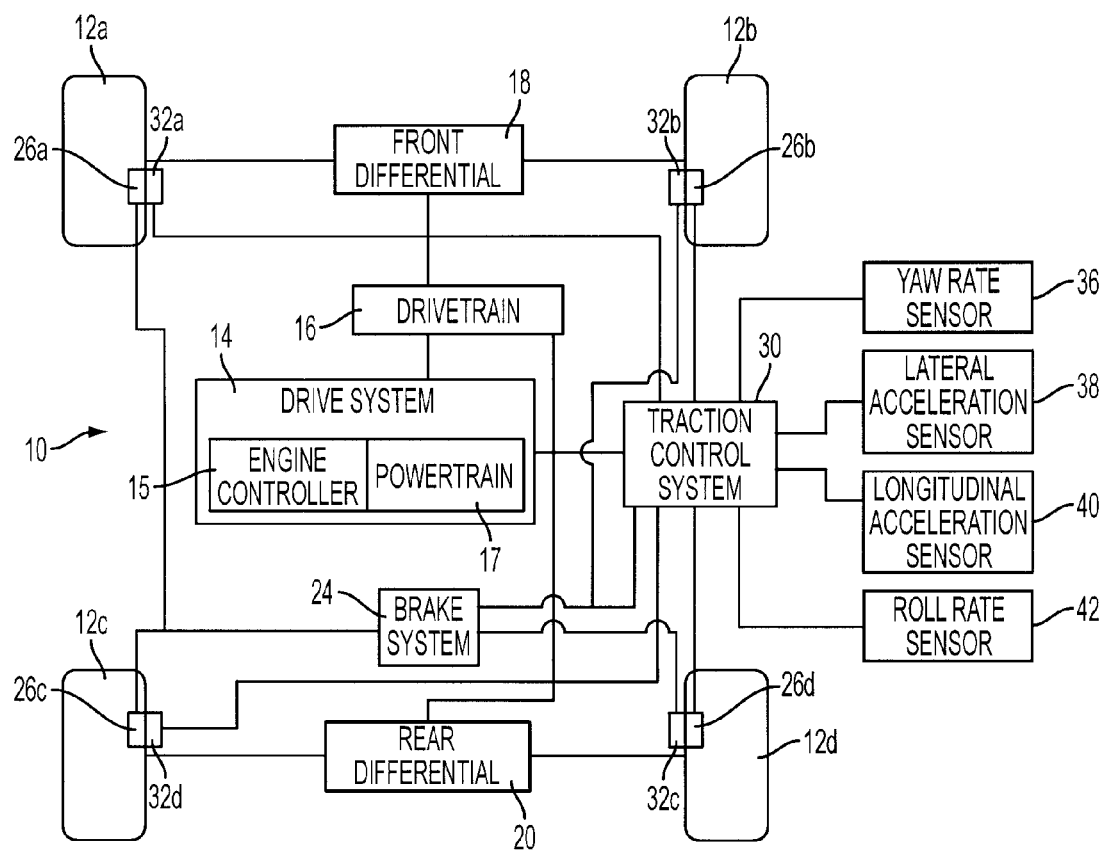
FIG. 1 is a block diagram of a vehicle having a traction control system.

FIG. 1 is a block diagram of a vehicle 10 having a traction control system. As shown in FIG. 1, vehicle 10 may comprise wheel and tire assemblies 12a, 12b, 12c, and 12d. A drive system 14 coupled to a drivetrain 16 may provide power to the wheel and tire assemblies 12a-d through a front differential 18 and rear differential 20. Drive system 14 may include an engine controller 15 and a powertrain 17. Engine controller 15 may be a microprocessor-based system. Powertrain 17 may provide power by a power generating unit, such as an internal combustion engine, a hybrid electric system, an electric drive system, or a fuel cell system. Engine controller 15 may control the amount of torque and thus the amount of slip generated at each of the wheels. Drive system 14 may vary the amount of power output to effect a change in torque at wheel and tire assemblies 12a-d.

Drive system 14 may provide torque through drivetrain 16, which may include a transmission, front differential 18 and rear differential 20. In a rear wheel drive vehicle, only the rear differential 20 would be present. A four wheel or all-wheel drive system may include both front differential 18 and rear differential 20. Further, in certain all-wheel drive system, an additional center differential may be provided.

Vehicle 10 may include a brake system 24 to actuate brakes 26a, 26b, 26c, and 26d. A brake system 24 may include an electric, electro-hydraulic, or hydraulic system. The brakes are activated in response to a driver input.

Vehicle 10 may also include a traction control system 30. Traction control system 30 may be coupled to drive system 14 and coupled directly or indirectly to wheel speed sensors 32a, 32b, 32c, and 32d. Traction control system 30 may generate a control signal or torque command to reduce the amount of torque to the engine upon sensing a slipping wheel. In some embodiments, the traction control system may also generate a braking command to increase wheel braking upon sensing the slipping wheel from the wheel speed sensors.

Wheel speed sensors may provide information for traction control among other purposes. As shown in FIG. 1, wheel speed sensors 32a, 32b, 32c, and 32d may be coupled directly to the wheels. In some embodiments, the wheel speed signals may be the output from an anti-lock brake system, an axle sensor, etc.

Additionally, various dynamic sensors may be coupled to traction control system 30. Dynamic sensors may include a yaw rate sensor 36, a lateral acceleration sensor 38, and a longitudinal acceleration sensor 40. Yaw rate sensor 36 generates a yaw rate signal corresponding to the yaw rate of the vehicle. From yaw rate sensor 36, the yaw acceleration may also be determined. The lateral acceleration sensor 38 generates a lateral acceleration signal corresponding to the lateral acceleration of the vehicle body. Longitudinal acceleration sensor 40 generates a longitudinal acceleration signal corresponding to the longitudinal acceleration of the vehicle. The various sensors may be directly coupled to various vehicle dynamic control systems, such as a yaw control system or a rollover stability control system. A roll rate sensor 42 may also be used to determine load transfer for the vehicle.

Figure 2:
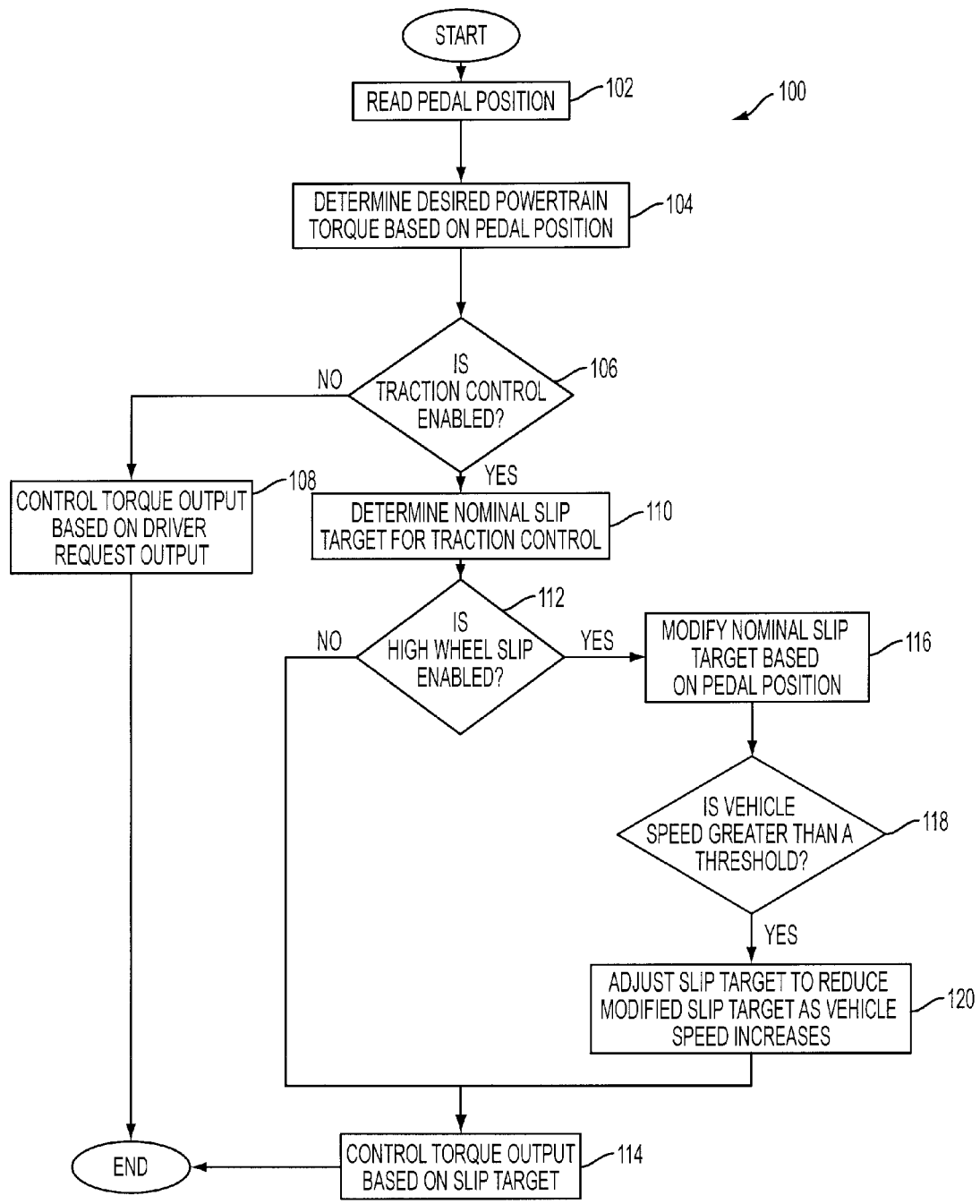
FIG. 2 is a high-level flowchart illustrating a traction control method to operate a vehicle according to an embodiment of the present disclosure.

FIG. 2 is a high-level flowchart illustrating a traction control method 100 to operate vehicle 10 according to an embodiment of the present disclosure. Traction control may be used to control wheel spin or slip in order to maintain vehicle control. While a small amount of wheel slip occurs during normal driving conditions, extra slip under some conditions may greatly reduce interaction (e.g., traction) between the road surface and tires. As a result, the wheels may free-spin instead of performing as desired, such as accelerating or moving the vehicle in a desired direction. Typically, a vehicle powertrain generates a power output, such as torque output based on a driver's demand. However, during traction control, the driver's demand is typically overridden. Instead, the powertrain may generate a reduced torque output independent of the driver's demand. Alternatively, or in addition, the brake system may generate increased wheel braking at one or more wheels. The reduced torque output and increased wheel braking may reduce the wheel slip, which results in an increased surface-tire interaction. Thus, the vehicle may acquire the desired road surface-tire interaction for normal driving.

While a decreased wheel slip is targeted during traction control, a wheel spin or slip greater than the targeted value may be desired in some conditions where traction control is activated. For example, a high wheel slip may move a stuck vehicle in some road conditions. In another example, a high wheel slip may be desired before launching a vehicle during a performance demonstration. While one approach may disable traction control, or switch to an alternative traction control mode, disabling and subsequently enabling traction control, or switching operating modes, may require manual operations by a driver. However, in an alternative approach, as described herein, an approach can be used to enable the driver to control the wheel slip under specific situations to achieve desired objectives during traction control in a more smooth and continuous manner.

Further, it should be appreciated that controlled output torque from the powertrain does not necessarily result in controlled wheel slip. For example, friction between the road surface and the tire may be time-varying, and as such for a given wheel torque, wheel spin may vary rapidly and substantially depending on conditions.

Now referring back to FIG. 2, first, at 102, method 100 includes reading a pedal position actuated by a driver. At 104, method 100 includes determining a desired powertrain output, such as a torque output based on the pedal position and operating parameters, such as vehicle speed, gear ratio, etc. The pedal position may indicate a driver requested output or a driver's demand. Next, at 106, method 100 determines whether traction control is enabled. If the traction control is not enabled, method 100 includes controlling torque output based on a driver requested output. At 108, the vehicle is operating at a normal condition where the powertrain generates a torque output to the wheel and tire assemblies of the vehicle based on a driver's demand as represented by the pedal position. As described above, the powertrain may include an internal combustion engine, an electric hybrid system, an electric system, a fuel cell system, or other system that powers the vehicle.

If the traction control is enabled, the vehicle is operated in a traction control mode. Traction control may be enabled automatically when a specific threshold is satisfied. For example, traction control may be activated when a high wheel slip speed is detected or a free spin is detected by wheel speed sensors. Alternatively, traction control may be initiated manually by the driver via an actuator on a vehicle's dash board. At 110, method 100 determines a nominal slip target for the traction control. The nominal slip target may be a predetermined value for traction control. In some embodiments, the nominal slip target may be selected from a table or polynomial with two independent inputs of a road-tire friction coefficient ($\mu$) and the vehicle speed. If the nominal slip target is exceeded, the driver's demand for greater torque via the accelerator pedal may result in even higher wheel slip. Thus, as described below, an intervention through traction control may be used to override the operator's request and control wheel slip at the predetermined level.

Next, at 112, method 100 determines whether high wheel slip is enabled. As described above, a high wheel slip may be desired under some conditions. For example, high wheel slip may be desired during a performance demonstration. In another example, high wheel spin may be able to move a struck vehicle under certain circumstances. Thus, method 100 may include a strategy to meet such requirements without disabling the traction control or switching to another traction control mode.

If the high wheel slip is not enabled, method 100 includes controlling the torque output based on the slip target. From step 112 to step 114, the vehicle may be operating at a normal traction control. As described above, in some embodiments, the torque output may be reduced to control the slip to be at or under the slip target. The torque output is independent from the driver requested output during the normal traction control. Thus, the driver may neither control the torque output or the wheel slip.

If the high wheel slip is enabled, at 116, method 100 includes modifying the nominal slip target based on the pedal position. In this way, the driver may control the wheel slip. The high wheel slip may be achieved via the actuation of the pedal by the driver. Thus, the driver gains some degree of control over the vehicle operation. Modification of the nominal slip target may depend on traction control events and will be described in detail below. As described in further detail below with regard to FIGS. 6-7, controlling increased wheel slip to a level set responsive to pedal position may be used during a stuck vehicle condition that persists for a specified duration. Additionally, as described in further detail below with regard to FIGS. 8-9, it may be used during performance spin operation on high friction surfaces.

Next, at 118, method 100 determines whether a vehicle speed is greater than a threshold. In some embodiments, as the vehicle speed exceeds the threshold, high wheel slip may no longer be desired. In one example, the traction control with the nominal slip target may be more suitable for the changed vehicle speed. In another example, it may be desirable to operate at normal vehicle operating condition where the torque output is proportional to the driver's demand.

If the vehicle speed is greater than the threshold, at 120, method 100 may include adjusting the slip target to reduce the modified slip target as the vehicle speed increases. The slip target may be adjusted gradually or continually as the vehicle speed increases. Thereafter, the vehicle may be operated under normal traction control with a fixed nominal slip target.

After step 120, method 100 may go to step 114 where the torque output is controlled based on the slip target. From step 116 to step 120, the torque output may be controlled dependent on the driver's demand. As the pedal is actuated, the slip target is modified or adjusted. Thus, wheel slip may be changed as the slip target changes.

Method 100 makes it possible to integrate various vehicle operating modes. For example, normal traction control may be transferred smoothly by the accelerator pedal to a particular traction control function that permits a controlled wheel slip. The particular traction control may roll off smoothly as vehicle speed changes.

Figure 3:
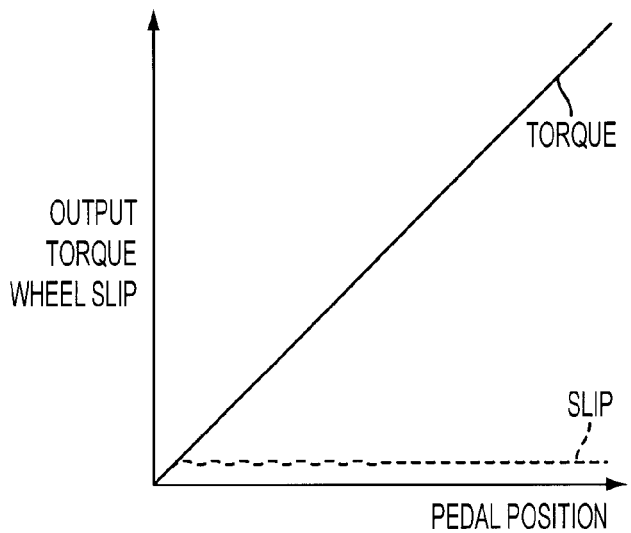
FIG. 3 shows schematic relationships of the powertrain torque output with the pedal position and a schematic relationship of the wheel slip with the pedal position during normal vehicle operating conditions without traction control engaged.
Figure 4:
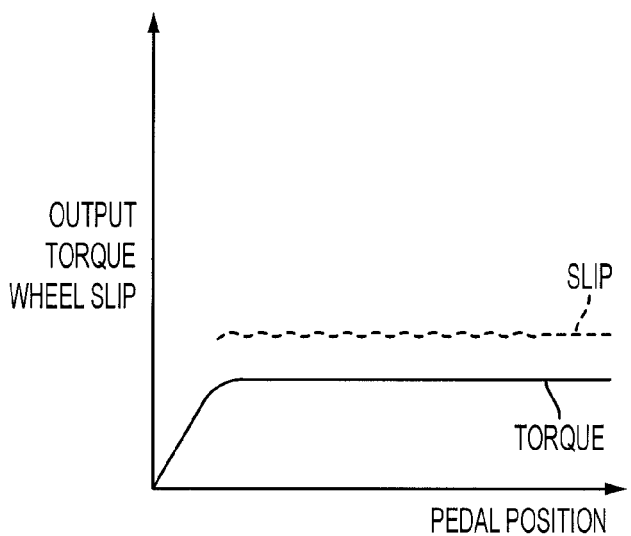
FIG. 4 shows a schematic relationship of powertrain torque output with the pedal position and a schematic relationship of the wheel slip with the pedal position during a traction control.
Figure 5:
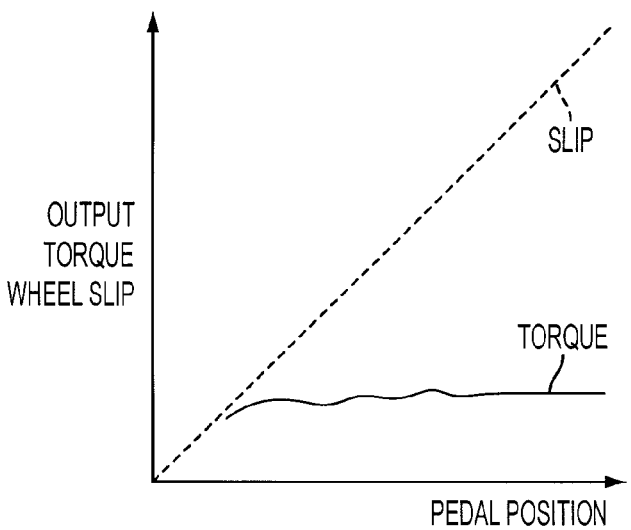
FIG. 5 shows a schematic relationship of powertrain torque output with the pedal position and a schematic relationship of the wheel slip with the pedal position during a traction control with varied slip target by the pedal.

Specifically, at 112, method 100 includes operating the powertrain at a torque output determined based on the nominal slip target and actual wheel spin. The determined torque output may override the driver requested torque by reducing the torque to actively control the wheel slip based on wheel slip feedback. In other words, at some conditions, the powertrain may be controlled to provide torque output independent of the driver's demand at some conditions until the traction control no longer needs to reduce the torque output to control slip. Note that in some embodiments, reducing torque output may be accomplished by decreasing engine torque and/or increasing wheel braking via an anti-lock brake system. At some conditions, powertrain may be controlled to vary the slip target such that the wheel slip can be controlled by the driver. Referring now to FIGS. 3-5, various relationships between the pedal, powertrain output torque, and wheel slip are illustrated. The graphs show, at a high level, how the output torque and slip correlate to the pedal actuation during different conditions. Specifically, FIG. 3 shows the correlation during conditions where traction control does not intervene, FIG. 4 shows the correlation where traction control overrides the driver's request to assist driving the vehicle during low friction road conditions, and FIG. 5 shows the correlation where the operator has direct interaction with controlling wheel slip to provide improved performance under specific conditions where higher amounts of wheel slip may be desirable.

Referring now specifically to FIG. 3, it shows schematic relationships between powertrain torque output and pedal position, and between wheel slip and pedal position, during conditions where the traction control does not intervene, but rather the operator controls powertrain output via the pedal. As shown in FIG. 3, during normal vehicle operating conditions, the torque output increases proportionally as the pedal position increases, i.e., powertrain torque output varies in response to a driver's demand. While this example shows a linear relationship, this is merely one example, and various relationships may be used. While some reduced amount of wheel slip may exist during normal vehicle operating conditions, such slip is tolerated since friction between the road surface and wheel may still be sufficiently high to provide the required traction for vehicle movements. Further, since the slip is not used in controlling output, the slip is uncorrelated with pedal actuation.

FIG. 4 also shows torque output and wheel slip, but for conditions, such as slippery roads, where the driver's request is overridden as soon as the driver's would result in excessive slip. Specifically, for very low pedal actuation, the requested torque may be provided responsive to the pedal actuation since the low torque level would not result in excessive slip. However, once excessive slip is generated, traction control controls the output torque (e.g., by generated wheel brake torque and/or by reducing engine torque) to control the slip. Under this condition, as shown by FIG. 4, the output torque is uncorrelated with pedal actuation. Thus, as the operator moves the pedal, there is no effect on wheel torque and the torque is independent of the pedal position (unless, of course, the pedal is reduced to request a torque so low that excessive slip is avoided). While FIG. 4 illustrates just one example slip condition, it should be appreciated that this is just for explanatory purposes.

FIG. 5 shows wheel slip for conditions (such as a race track, or a stuck vehicle) where the driver's request generates slip, but is translated to control a slip level, rather than a torque level. As shown in FIG. 5, the wheel slip is based on the pedal position. For example, the target wheel slip may be directly proportional to the pedal actuation. While FIG. 5 shows a straight line relationship, this is provided simply for illustration purposes.

Continuing with FIG. 5, the torque is not directly correlated to pedal actuation, in that the torque is controlled to provide the desired slip. Thus, while actuation of the pedal may result in a torque output change, the torque controls the slip, rather than being directly correlated with the pedal actuation. As such, FIG. 5 illustrates traction control operation where the driver has a certain degree of control over the wheel slip operation.

Figure 6:
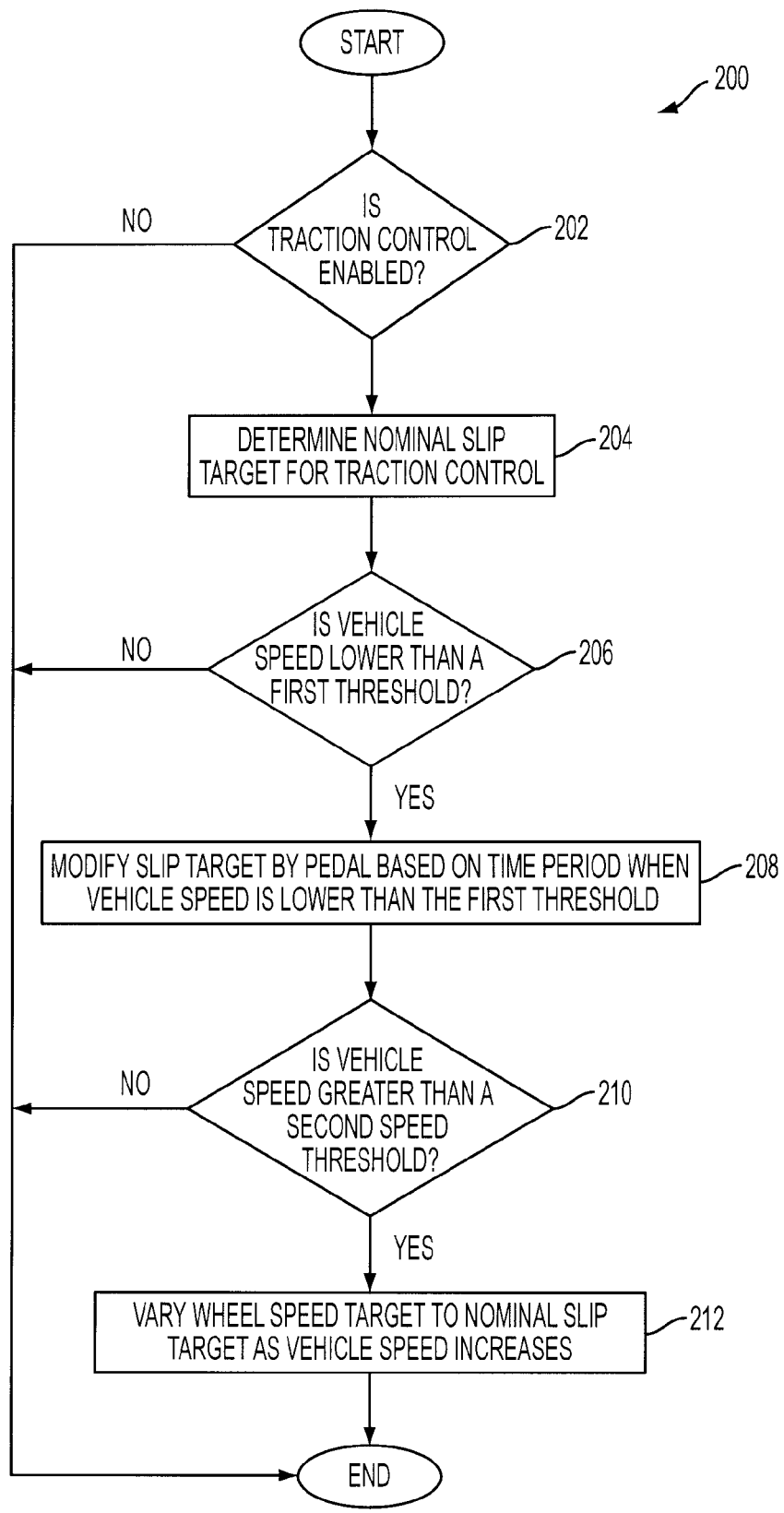
FIG. 6 is a flow chart illustrating an exemplary method of traction control with varied slip targets for a stuck vehicle.

Referring now to FIG. 6, it illustrates additional details of traction control operation via method 200 where the slip targets may be adjusted for a stuck vehicle. For example, when a vehicle is stuck, the wheel slip may be controlled under a predetermined level to increase the road surface-tire interaction by reducing torque output. However, traction control may not always be able to move the vehicle. Fruitless efforts by the driver (e.g., pressing the accelerator pedal with little to no effect on the powertrain output torque) may frustrate the driver for lack of control over the vehicle. Thus, it may be desirable to impart the driver with some degree of control. Method 200 illustrates an example routine to vary the wheel slip target by an accelerator pedal to provide the driver such control.

First, at 202, method 200 determines whether the traction control is enabled. If the traction control is enabled, then at 204, method 200 includes determining a nominal slip target for traction control. As the friction between the road surface and the tires is inversely proportional to the wheel speed or the wheel slip, a lower slip speed may result in higher friction. Thus, control of the wheel slip at or under the nominal slip target may obtain the surface-tire interaction or the traction required for normal vehicle operation.

Next, at 206, method 200 determines whether the vehicle speed is lower than a first threshold for longer than a predetermined duration. The first threshold may indicate a traction event or a vehicle condition. In some embodiments, the first threshold may be zero, which indicates that the vehicle does not move or the vehicle is stuck.

If the vehicle speed is lower than the first speed threshold, then at 208, method 200 includes modifying the slip target responsive to actuation of the accelerator pedal. In this way, the wheel slip may be controlled by the driver. In some embodiments, the wheel slip may be increased during the traction control by a driver's demand. Further, in some embodiments, modifying the slip target may include increasing the slip target based on an increased pedal position as illustrated in FIG. 5 to provide controlled wheel slip.

Additionally, the slip target may be modified based on a duration or a time period of the traction event. As described in further detail with reference to FIG. 7, in some embodiments, as the duration increases, the traction control system may be configured to increase the slip target as the duration of the traction event increases. Thus, additional wheel slip may be permitted as the vehicle condition appears more stuck.

Next, at 210, method 200 determines whether the vehicle speed is greater than a second threshold. In some embodiments, the second threshold may be a speed at which higher wheel slip is no longer desired. In one embodiment, the second threshold may be zero, i.e., step 210 may determine whether the vehicle is moving or is rolling off the stuck condition.

Next, at 212, method 200 may include adjusting or varying the slip target to the nominal slip target. In some embodiments, the wheel slip target may be changed gradually to the nominal slip target as the vehicle speed increases. Alternatively, the wheel slip target may be changed to the nominal slip target once the vehicle speed is greater than the second threshold.

Figure 7:
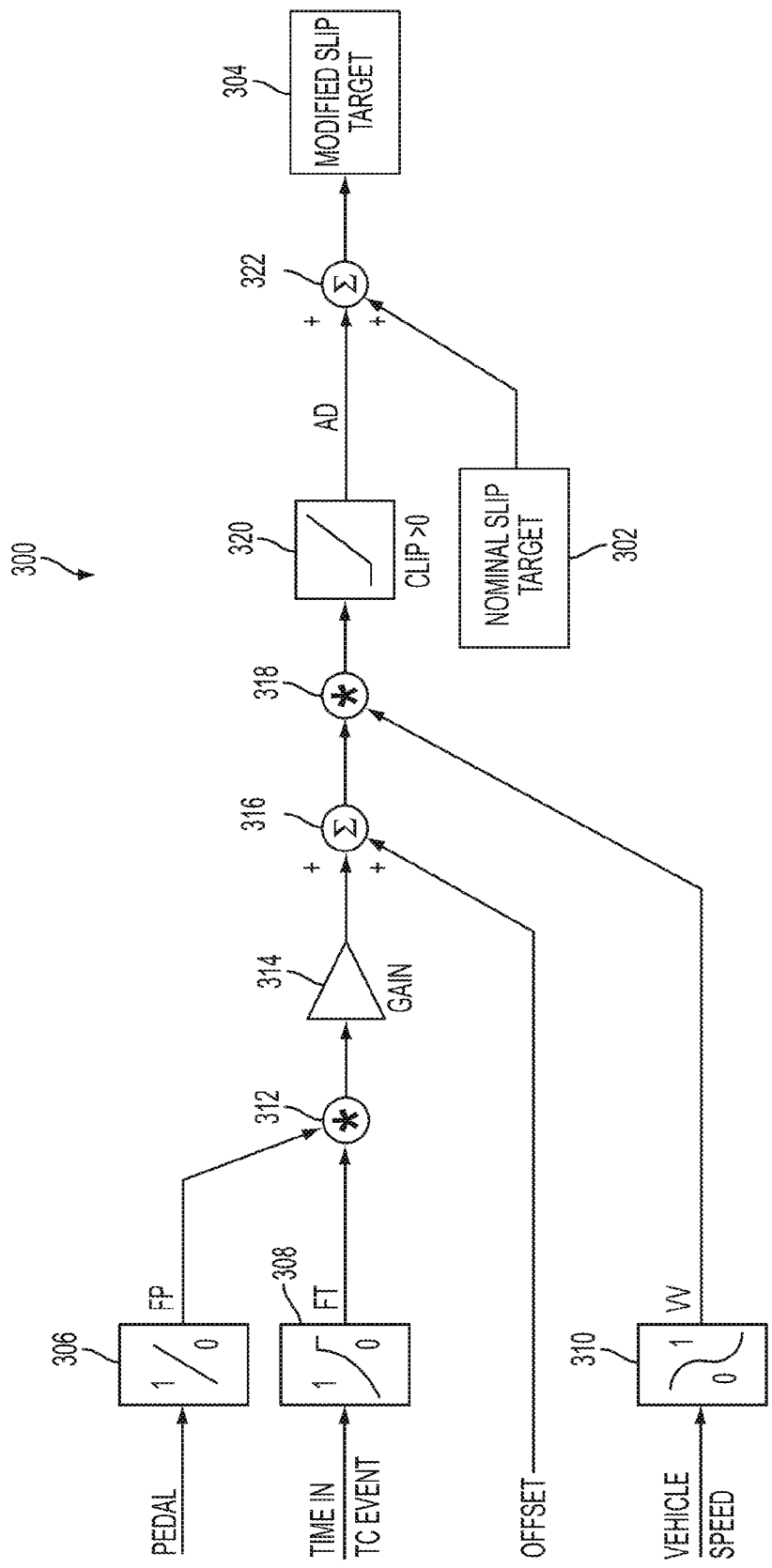
FIG. 7 is a schematic control diagram illustrating an exemplary control algorithm for a time and pedal-based assist in traction control for a stuck vehicle.

FIG. 7 is a schematic control diagram 300 illustrating an exemplary control algorithm for a time and pedal-based assist in traction control for a stuck vehicle in block diagram format. The slip target modification as described above with reference to FIG. 6 may be implemented using the control algorithm in FIG. 7. As shown in FIG. 7, a nominal slip target 302 may be modified by a pedal position based on a duration or a time period in a traction control event, and/or vehicle speed to obtain a modified slip target 304. In some embodiments, the pedal position may be processed by a pedal position computation component 306 to generate a pedal-related variable, FP, to the control algorithm. For example, FP may be calculated as a ratio of a pedal position to a maximum pedal position (e.g., wide-open pedal position), $pedal_{wide-open}$, as below:

$$FP=pedal/(pedal_{wide-open}). \quad (1)$$

In some embodiments, the duration in the traction event may be processed in a time computation component 308 to generate a time-related variable, FT. In one example, the time-related variable, FT, may be calculated as below:

$$FT=MIN((timer/timer_{max})^2,1) \quad (2)$$

wherein the $timer_{max}$ is the maximum time of the traction event.

To implement the control algorithm, a timer may be included in the traction control system to count for the duration of the traction event. In the depicted embodiment, the traction event is a stuck vehicle condition. If the vehicle is under the traction control and the vehicle speed is lower than a speed threshold (e.g., vehicle speed is zero), the timer may increment. In some embodiments, a vehicle speed may be processed in a speed computation component 310 to generate a speed-related variable, VV, in order to account for vehicle speed in modifying the slip target. The speed-related variable, VV, may be calculated as below:

$$VV=speed_{rolloff}/(max(speed,speed_{rolloff})). \quad (3)$$

where $speed_{rolloff}$ may be a speed at which the vehicle is moving greater than a speed threshold. A slip target adjustment, AD, may be obtained as a function of the pedal position, the duration of the traction event, and/or vehicle speed. For example, the pedal-related variable, FP, may be multiplied by the time-related variable, FT, at 312 and be incorporated with appropriate gain at 314. Additionally, at 316, an offset may be added. Further, the vehicle speed may be incorporated at 318. Then, at 320, the slip target adjustment, AD, may be calculated as below:

$$AD=max([(FP \times FT \times GAIN+OFFSET) \times VV],0). \quad (4)$$

The modified slip target may be calculated as below:

$$\text{modified slip target}=AD+\text{nominal slip target}. \quad (5)$$

As described by the above algorithm, the slip target during a traction control may be modified by the pedal position, where the adjustment of the slip target by the pedal allows a driver to directly control the degree of wheel slip proportionally to pedal depression. Thus, the driver can control the wheel slip during traction control under some conditions.

Further, the slip target adjustment may be based on the condition of the traction event. For example, the duration the vehicle is stuck may represent an extent of the stuck condition. A longer duration may indicate a more serious stuck condition. Under some road conditions, higher wheel slip may be desired as the vehicle appears more stuck. Thus, the time-related variable may be configured to contribute more to the slip target adjustment as the timer increments. As shown in equations (2) and (4), as the timer increases, the slip target adjustment AD may be increased effectively (e.g., AD increases with square of the time, for example). In this way, in an early stage of the stuck condition, the normal traction control (i.e., traction control without varied slip target) may be implemented and may not be substantially overridden by the driver's early launch attempt. However, as the condition appears more stuck, additional wheel slip by the pedal may be allowed. In other words, the pedal becomes more effective in adding slip speed to the nominal slip target as the timer increases. It should be noted that the timer may be a function of actual slip control (in an active traction mode) and being under a measurable speed.

Additionally, the slip target adjustment may depend on the vehicle speed as shown in equations (3) and (4). When the vehicle speed is greater than a predetermined speed, $speed_{rolloff}$, the speed-related variable VV decreases. As VV decrease to a certain valued, AD becomes zero. Therefore, the slip target gradually resumes the nominal slip target.

The method described has several advantages. For example, the driver is given some degree of control over the vehicle operation when traction control is activated and the vehicle is stuck. Thus, the driver may be satisfied that everything was tried before external manual assistance is required to move the vehicle. Further, the high wheel slip may assist to move the stuck vehicle under some conditions. Moreover, since the duration for the traction control event and vehicle speed are accounted for by the slip target variation, the different operating modes, such as normal vehicle operation, normal traction control and traction control with varied slip target by pedal can be transitioned smoothly or continually. Thus, sudden changes in vehicle response may be reduced.

In addition to the stuck vehicle condition described above, the slip target controlled by the driver may be implemented for other traction control events. For example, higher spin during traction control may be desired in performance and demonstration spin. Traction control is typically enabled during low speed demonstrations and closed track performances. As described above, the wheel spin is restricted under the nominal slip target during normal traction control. However, higher wheel spin may be desired on high μ surfaces, such as race tracks or demonstration surfaces for demonstration purposes. In order to achieve high spin, conventional vehicle control systems may disable the traction control or change the operating mode from the traction control to a special control state. However, since traction control may be required to meet the acceleration requirement following high wheel spin, the operation mode transition may need to be performed. Mode transitions in a short time period may require experience and training for a driver to master. Thus, it may be desirable to change the wheel spin continuously based on an accelerator pedal position, road conditions, vehicle speed, etc. for the purpose of low speed demonstration and closed track performances.

Figure 8:
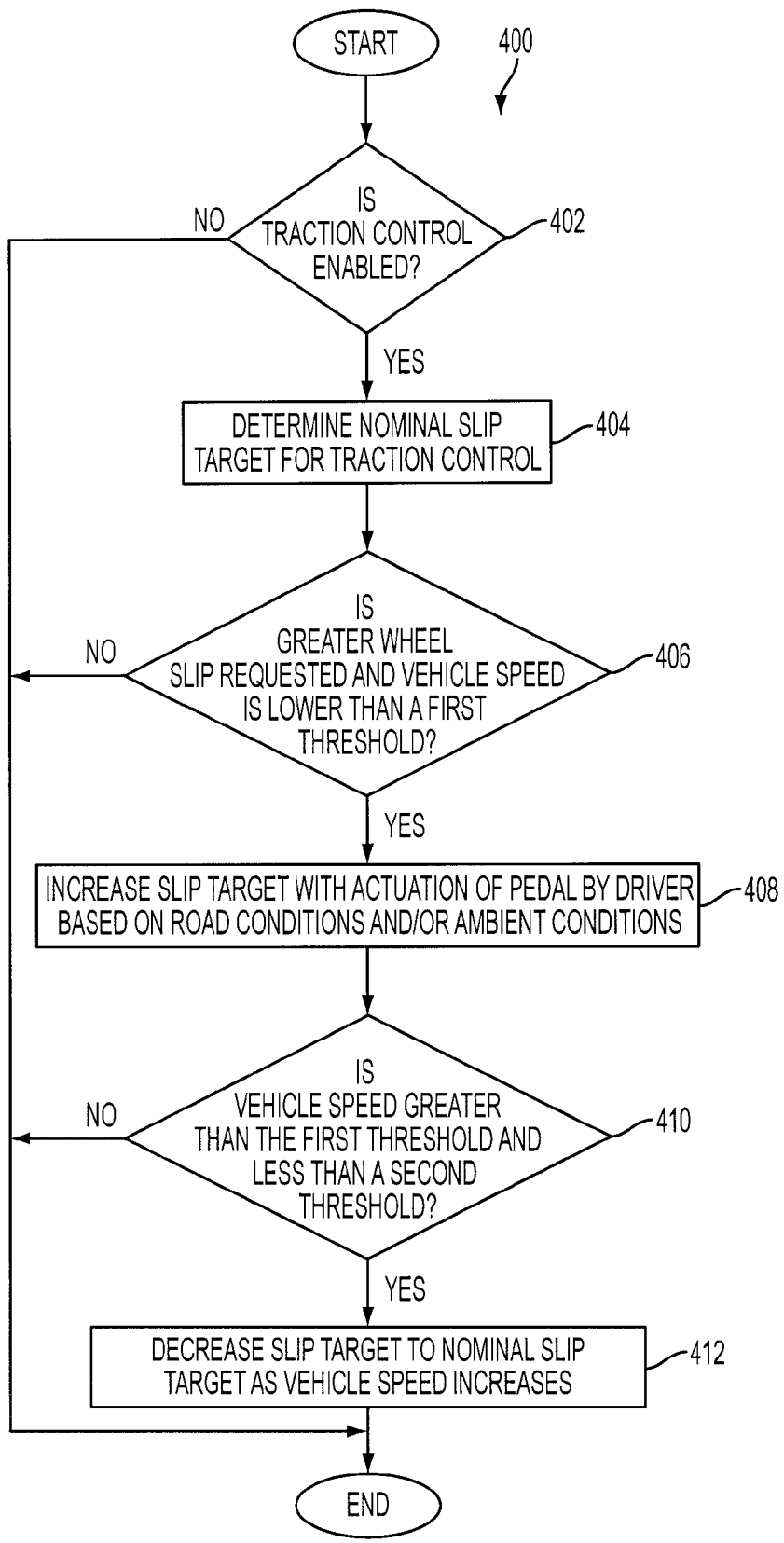
FIG. 8 is a flow chart illustrating an exemplary method of traction control used for performance and demonstration spin of a vehicle according to one embodiment of the present disclosure.

FIG. 8 is a flow chart illustrating an exemplary method 400 of traction control used for performance and demonstration of a vehicle according to an embodiment of the present disclosure. Operation according to FIG. 8 may be used to improve operation when the friction coefficient (μ) is greater than a threshold, where the first road condition may occur on the track during low speed demonstrations and closed track performances.

First, at 402, method 400 determines whether traction control is enabled. If the traction control is enabled, then at 404, method 400 includes determining a nominal slip target for traction control. In some embodiments, the nominal slip target may be determined based on μ and vehicle speed.

Next, at 406, method 400 determines whether high wheel slip is required. In some embodiment, the high wheel slip may be required at a road condition that includes a condition where the friction coefficient (μ) is greater than a road condition threshold. In some embodiments, the road condition threshold may be greater than a road condition threshold for normal traction control operation.

Step 406 may further determine whether the vehicle speed is lower than a first speed threshold. The first speed threshold may be a speed under which a vehicle performs a demonstration spin. As described above, high spin may be advantageous for performance demonstrations at low speed. In some circumstances, high spin may be desired to create "burn-rubber" effect or blue smoke.

If high spin is required and/or the vehicle speed is lower than the first speed threshold, then at 408, method 400 includes increasing the slip target based on depression of the accelerator pedal, and further based on road surface conditions and/or ambient conditions. The increased slip target allows increased wheel slip during traction control. Under appropriate conditions, the high wheel spin may generate desired vehicle performance. For example, at high μ (i.e., great interaction between the wheels and road surface), "burn-out" effect or blue smoke may be generated by high wheel spin due to frequent contact and greater interaction between the road surface and wheel. As a result, the vehicle may show stronger horse power during the performance demonstration. In some embodiments, the wheel slip target may be increased as μ increases. As noted herein, the value of μ may be determined by any suitable approach. In one example, μ may be estimated based on the vehicle operating conditions, such as driven wheel speed or non-driven wheel speed detected by the wheel speed sensors.

Additionally, or alternatively, the wheel slip target may be adjusted based on ambient conditions. In one example, an ambient condition may include an ambient temperature. In some embodiments, the ambient temperature is temperature in areas adjacent to the wheels. As μ and wheel spin increase, the ambient temperature may increase. Thus, increased temperature may indicate that road condition is stable or appropriate for the slip target increase. An exemplary approach to increase the slip target will be described in detail in reference with FIG. 9. Next, at 410, method 400 determines whether the vehicle speed is greater than the first threshold and less than a second threshold. The second speed threshold may be a predetermined value above which normal traction control is used to transition through normal traction control to non-slipping acceleration. In one embodiment, the second speed threshold may be approximately 10 miles per hour.

Next, at 412, method 400 may include decreasing the wheel slip target based on the accelerator pedal as the vehicle speed increases. In this way, the nominal slip target may be restored when the vehicle speed exceeds the second threshold. In other words, normal traction control with the nominal speed target may be resumed. Normal traction control may facilitate the desired acceleration thereafter, and finally to substantially non-slipping conditions.

Figure 9:
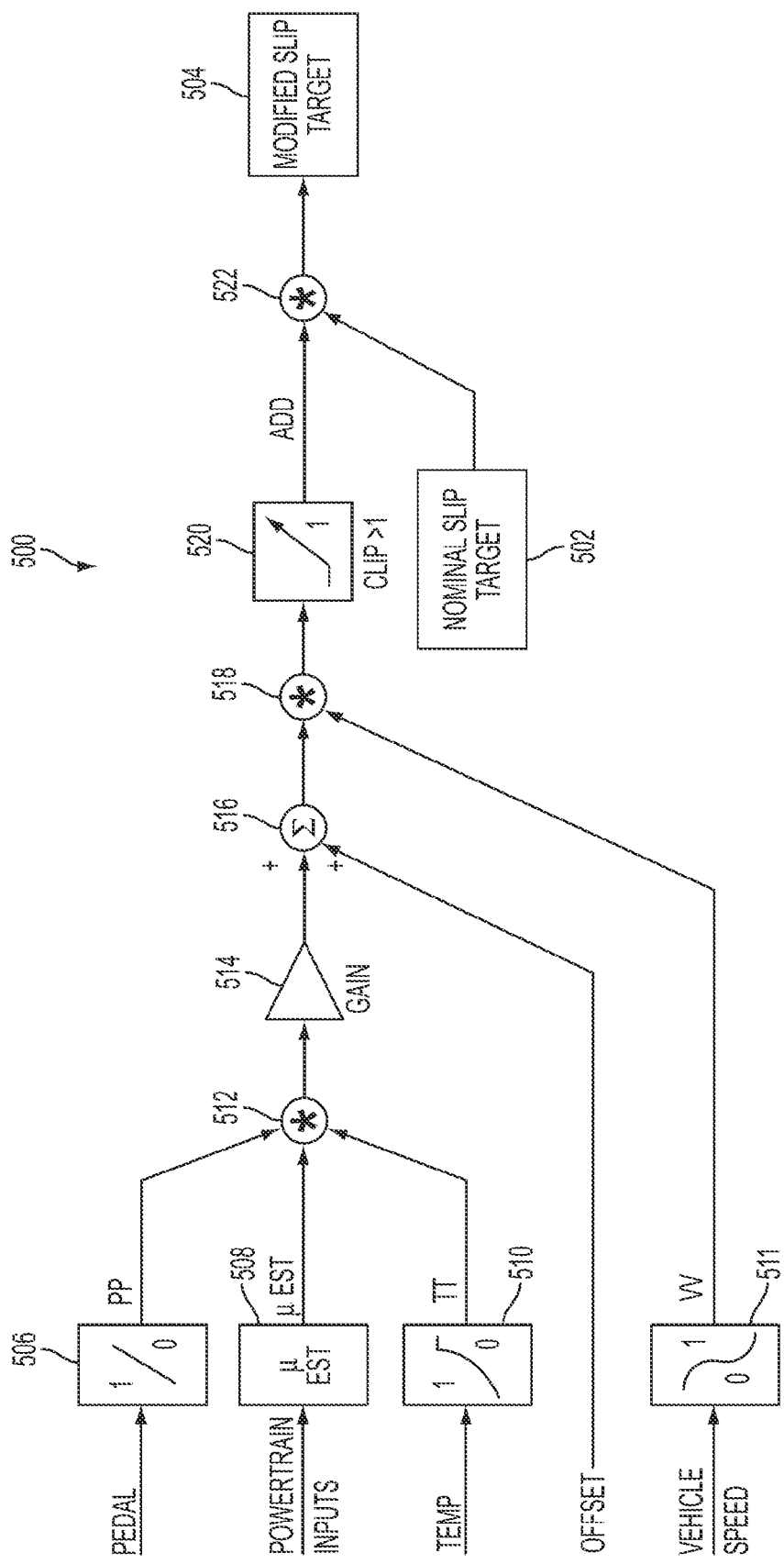
FIG. 9 is a schematic control diagram illustrating an exemplary control algorithm to modify a slip target for a traction control during a vehicle's performance and demonstration.

FIG. 9 is a schematic control diagram 500 illustrating an exemplary control algorithm for traction control during a vehicle's performance and demonstration. The slip target modification as described above with reference to FIG. 8 may be implemented using the control algorithm in FIG. 7. As shown in FIG. 9, a nominal slip target 502 may be modified based on road conditions, ambient conditions, or vehicle speed by a pedal to obtain a modified slip target 504. In some embodiments, the pedal position may be processed by a pedal position computation component 506 to generate a pedal-related variable. In one example, the pedal-related variable, PP, may be calculated as a ratio of a pedal position to a maximum pedal position (e.g., wide-open pedal position), $pedal_{wide-open}$, as below:

$$PP = pedal/(pedal_{wide-open}). \quad (6)$$

In some embodiments, μ may indicate an appropriate condition for slip target increase. Thus, μ may be determined at μ determination component 508. In some embodiments, μ may be estimated based on powertrain inputs or the vehicle operating conditions, such as wheel speed, etc.

Additionally, or alternatively, ambient temperature may be used as a variable for appropriate conditions. The ambient temperature may be processed in a temperature computation component 510 and may be clipped to obtain a temperature-related variable as below:

$$TT = Clip(32° F., AAT, AAT_{app}) - 32° F.)/(AAT_{app} - 32° F.) \quad (7)$$

where AAT is the current ambient temperature, $AAT_{app}$ may a predetermined temperature at which desired performance may be created by increasing wheel spin. When the ambient temperature is below $AAT_{app}$, there may be an unexpected change in μ, i.e., low μ in one example. Thus, desired performance, such as "burn-out" or blue smoke, may not be generated. When AAT is above $AAT_{app}$, the slip target increases as the ambient temperature increases.

Additionally, in some embodiments, a vehicle speed may limit the slip target adjustment. The vehicle speed may be processed in a speed computation component 511 to output a speed-related variable in order to account for vehicle speed in adjusting the slip target. The speed-related variable, VV, may be calculated as below:

$$VV = \text{speed}_{rolloff}/(\max(\text{speed}, \text{speed}_{rolloff})). \quad (8)$$

where $\text{speed}_{rolloff}$ is a predetermined value and may be a speed at which the vehicle is about to move from the launch. As shown in the equation (8), VV is inversely proportional to the vehicle speed. When the vehicle speed is less than $\text{speed}_{rolloff}$, VV equals 1.0 and the slip target increase is not limited by the vehicle speed. However, as the vehicle speed exceeds $\text{speed}_{rolloff}$, VV is less than 1.0. Thus, the slip target increase is restricted by the vehicle speed.

A slip target adjustment value, ADD, may be determined as a function of the variables μ, PP, and TT. In the depicted embodiment, the variables, μ, PP, and TT may be multiplied at 512 and may be incorporated with appropriate gain at 514. Additionally, an offset may be added at 516. Further, the slip target adjustment value may depend on the vehicle speed. Thus, the vehicle speed may be multiplied at 518. Then, at 520, the processed value may be clipped to be greater than 1.0 to obtain the slip target adjustment, ADD. The above control algorithm may be described by the equation below:

$$ADD = \max([(PP \times TT \times \mu \times \text{GAIN} + \text{OFFSET}) \times VV], 1). \quad (9)$$

The modified slip target may be calculated as below:

$$\text{modified slip target} = ADD \times \text{nominal slip target}. \quad (10)$$

The above control algorithm allows the slip target to be increased by the pedal as μ and ambient temperature increase. Further, the slip target may be adjusted depending on the vehicle speed. As shown in equations (8), when the vehicle speed is less than $\text{speed}_{rolloff}$, VV increases. However, as the vehicle speed increase to be greater than $\text{speed}_{rolloff}$, VV decreases. Thus, the slip target increase is limited by the vehicle speed. As the vehicle speed increases, VV may be lower to a value, such that ADD equals 1.0. In this way, the slip target may be restored to the nominal slip target.

Alternatively, the following equations may be used to adjust the slip target based on the slip adjustment value:

$$\text{modified slip target} = ADD + \text{normal slip target} + ADD \times \text{nominal slip target} \quad (11)$$

Equation (11) may modify the slip target smoothly under some conditions. It should be appreciated that the any suitable algorithm may be used to modify the slip target to achieve the desired performance effect.

The control method and algorithm described above have various advantages. For example, as condition (e.g., μ and/or ambient temperature) allows, the driver can smoothly control the slip target or the wheel spin with the pedal instead of the torque. Further, the slip target may be decreased to the nominal slip target as the vehicle speed increases. As the vehicle is restored to normal traction control, the traction required for acceleration can be provided. Furthermore, the vehicle dynamics do not change drastically during the entire process and traction control can be restored to the control with the nominal wheel slip target with the movement of only the pedal. In this way, rapid changes in slip targets can be avoided. Thus, the driver can obtain a smooth and continuous response to the environment and control input.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a powertrain of a vehicle with wheels and a driver-actuated pedal, comprising:
    controlling a wheel slip to a first amount, independent of a driver requested output torque during a first road condition; and
    controlling the wheel slip to a second amount based on the driver requested output torque during a second road condition, the second road condition having higher friction than the first road condition.

2. The method of claim 1, wherein the first amount is based on one of a friction coefficient (μ) and a vehicle speed.

3. The method of claim 2, wherein the driver requested output torque is overridden during the first road condition.

4. The method of claim 1, wherein the second amount is a function of a pedal position.

5. The method of claim 1, wherein a road condition is a friction coefficient (μ) between road surface and tires.

6. The method of claim 5, wherein the second amount is further based on an ambient temperature.

7. The method of claim 6, wherein the second amount is responsive to a vehicle speed.

8. The method of claim 7, wherein controlling the wheel slip to the second amount includes increasing the wheel slip when the vehicle speed is less than a first threshold.

9. The method of claim 8, wherein the second amount increases as the friction coefficient and the ambient temperature increase.

10. The method of claim 9, wherein the second amount decreases as the vehicle speed is greater than the first threshold.

11. The method of claim 10, wherein the second amount decreases to the first amount when the vehicle speed is greater than the first threshold and less than a second threshold.

12. A method for controlling a powertrain of a vehicle with wheels, the vehicle having a pedal actuated by a driver, the method comprising:
    when wheel slip is present and traction control is enabled,
        overriding a driver request for an output torque and controlling a wheel slip to a first amount during a first road condition by at least increasing wheel braking torque, the first amount independent of the driver request and selected to reduce the wheel slip; and
        overriding the driver request and controlling the wheel slip to a second amount during a second road condition, the second amount proportional to the driver request and adjusted based on a vehicle speed, where the controlled wheel slip is reduced as the vehicle speed increases, the second road condition having higher friction than the first road condition; and
    providing engine output responsive to the driver request otherwise.

13. The method of claim 12, wherein the first amount is determined based on one of a road friction coefficient (μ) and the vehicle speed.

14. The method of claim 13, wherein the road conditions include friction between road surface and tires.

15. The method of claim 14, wherein increasing controlling the wheel slip is further based on an ambient condition.

16. The method of claim 15, wherein the ambient condition includes an ambient temperature.

17. The method of claim 16, wherein the controlled wheel slip is increased as the road friction coefficient ($\mu$) increases and the ambient temperature increases.

18. A vehicle comprising:
wheels;
an accelerator pedal actuated by a driver;
a powertrain to provide an output torque; and
a traction control system configured to override a driver requested output torque to control a wheel slip to a first amount during a first road condition and increase the wheel slip from the first amount to a second amount by the accelerator pedal during a second road condition when a vehicle speed is less than a first threshold,
wherein the second road condition has a higher road-tire friction than the first road condition.

19. The vehicle of claim 18, wherein the second amount is responsive to an ambient temperature.

20. The vehicle of claim 19, wherein the second amount increases as the road-tire friction and the ambient temperature increase.

* * * * *